(12) United States Patent
Yang et al.

(10) Patent No.: US 9,210,564 B2
(45) Date of Patent: Dec. 8, 2015

(54) AUTHORIZATION OF A COMMUNICATION NODE TO DETERMINE A BIT RATE

(75) Inventors: Yong Yang, Molndal (SE); John Stenfelt, Gothenburg (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 135 days.

(21) Appl. No.: 13/876,287

(22) PCT Filed: Sep. 28, 2010

(86) PCT No.: PCT/EP2010/064334
§ 371 (c)(1),
(2), (4) Date: Mar. 27, 2013

(87) PCT Pub. No.: WO2012/041366
PCT Pub. Date: Apr. 5, 2012

(65) Prior Publication Data
US 2013/0188527 A1    Jul. 25, 2013

(51) Int. Cl.
*H04W 8/18* (2009.01)
*H04W 28/22* (2009.01)

(52) U.S. Cl.
CPC ............... *H04W 8/18* (2013.01); *H04W 28/22* (2013.01)

(58) Field of Classification Search
USPC .................................................. 370/254, 310
See application file for complete search history.

(56) References Cited

U.S. PATENT DOCUMENTS

| | | | | |
|---|---|---|---|---|
| 8,085,783 B2* | 12/2011 | Zhou et al. | ............... | 370/395.21 |
| 8,107,471 B2* | 1/2012 | Nakamura et al. | ............ | 370/389 |
| 2005/0088968 A1* | 4/2005 | Lauer | ........................... | 370/229 |
| 2007/0249339 A1* | 10/2007 | Tamura et al. | ............... | 455/433 |
| 2008/0043697 A1* | 2/2008 | Huomo et al. | ............... | 370/342 |
| 2009/0052384 A1* | 2/2009 | Zisimopoulous et al. | .... | 370/329 |
| 2009/0086705 A1 | 4/2009 | Zisimopoulos et al. | | |
| 2009/0238207 A1 | 9/2009 | Zhao et al. | | |
| 2009/0316656 A1* | 12/2009 | Zhao et al. | ..................... | 370/331 |

(Continued)

FOREIGN PATENT DOCUMENTS

WO     2009090582 A1     7/2009

OTHER PUBLICATIONS

3rd Generation Partnership Project; Technical Specification Group Services and System Aspects; General Packet Radio Service (GPRS); Service Description; Stage 2 (Release 8), 3GPP TS 23.060 V8.9.0 (Jun. 2010), 280 pages.

(Continued)

*Primary Examiner* — Hassan Kizou
*Assistant Examiner* — Deepa Belur
(74) *Attorney, Agent, or Firm* — Rothwell, Figg, Ernst & Manbeck, P.C.

(57) ABSTRACT

The present solution relates to a method in a first communication node (109,113) for enabling authorization of the first communication node (109,113) to determine a first bit rate. The first communication node (109,113) receives (302,306, 401), from a second communication node (101), a message comprising at least one trigger to determine a first bit rate and obtains (303,308,402) a first rank. The node (109,113) determines (304,404) the first bit rate associated with the first rank, and transmits (305,312,405) the first bit rate associated with the first rank to the second communication node (101), enabling authorization of the first communication node (109, 113) to determine the first bit rate.

16 Claims, 5 Drawing Sheets

(56) References Cited

U.S. PATENT DOCUMENTS

| | | | |
|---|---|---|---|
| 2011/0096749 A1* | 4/2011 | Rune | 370/331 |
| 2011/0116478 A1* | 5/2011 | Zhang et al. | 370/331 |
| 2012/0224476 A1* | 9/2012 | Jin et al. | 370/229 |
| 2012/0239771 A1* | 9/2012 | Rasanen | 709/206 |
| 2013/0107799 A1* | 5/2013 | Karlsson et al. | 370/328 |
| 2013/0201832 A1* | 8/2013 | Kang et al. | 370/235 |
| 2014/0213256 A1* | 7/2014 | Meylan et al. | 455/436 |
| 2014/0344472 A1* | 11/2014 | Lovsen et al. | 709/232 |

OTHER PUBLICATIONS

3rd Generation Partnership Project; Technical Specification Group Services and System Aspects; Policy and Charging Control Architecture (Release 10), 3GPP TS 23.203 V10.0.0 (Jun. 2010), 126 pages.

3rd Generation Partnership Project; Technical Specification Group Services and System Aspects; General Packet Radio Service (GPRS) Enhancements for Evolved Universal Terrestrial Radio Access Network (E-UTRAN) Access (Release 9) 3GPP TS 23.401 V9.5.0 (Jun. 2010), 259 pages.

* cited by examiner

AUTHORIZATION OF A COMMUNICATION NODE TO DETERMINE A BIT RATE

CROSS-REFERENCE TO RELATED APPLICATION

This application is a 35 U.S.C. §371 National Phase Entry Application from PCT/EP2010/064334, filed Sep. 28, 2010, and designating the United States.

TECHNICAL FIELD

This invention relates generally to first communication node and a method in the first communication node. More particularly this invention relates to enabling authorization of the first communication node to determine a first bit rate.

BACKGROUND

The Quality of Service (QoS) concept of Aggregated Maximum Bit Rate (AMBR) was introduced for Evolved-Universal Mobile Telecommunications System (UMTS) Terrestrial Radio Access Network (E-UTRAN) in a Third Generation Partnership Project (3GPP) release and has then been adopted for Global System for Mobile communication (GSM) Enhanced Data rates for Global Evolution (EDGE) Radio Access Network (GERAN) and UTRAN in another release of 3GPP. The AMBR is a QoS parameter that is used to police/shape the bit rate of multiple non-Guaranteed Bit Rate (GBR) bearers belonging to the same user equipment.

There are two variants of AMBR: Access Point Name (APN)-AMBR and User Equipment (UE)-AMBR. The APN-AMBR is enforced for all non-GBR bearers belonging to the same user equipment that are associated with the same APN. For example a user equipment may have a default bearer and several non-GBR dedicated bearers for a single Packet Data Network (PDN)-connection activated at the same time. A user equipment may also have multiple PDN-connections active at the same time to the same APN e.g. in case the user equipment is acting as a router. All those bearers are then policed by the same APN-AMBR. According to the concept of APN-AMBR any bearer may use the full bit rate of the APN-AMBR if no traffic is transmitted on any of the other bearers, but if traffic is transmitted on multiple bearers at the same time then the aggregate traffic is policed so that the total maximum bit rate does not exceed the APN-AMBR. In a case of Long Term Evolution, i.e. $4^{th}$ Generation (4G), access, the APN-AMBR is part of the user equipment's subscription data and is provided by the Home Subscriber Server (HSS) to the Mobility Management Entity/Serving General Packet Radio Service (GPRS) Support Node (MME/SGSN). For the case of 2G/3G access, it is the Home Location Register (HLR) that provides the user equipment's subscription data.

The MME/SGSN provides the subscribed APN-AMBR to the PDN Gateway (PGW)/Gateway GPRS Support Node (GGSN), which in turn provides this value to the Policy and Charging Rule Function (PCRF) in case dynamic Policy and Charging Control (PCC) is deployed. The PCRF may then authorize a different value and send this back to the PGW/GGSN over the Gx interface, in case of GPRS. The PGW/GGSN in turn forwards this value to the MME/SGSN and further on to the user equipment. The enforcement of APN-AMBR in the Down Link (DL) direction is done in the PGW/GGSN. Enforcement of APN-AMBR in the Up Link (UL) direction is done in the user equipment and in the PGW/GGSN. Enforcement is done also in the PGW/GGSN simply for the reason that an operator may not trust that a certain user equipment implements UL APN-AMBR enforcement.

The UE-AMBR, on the other hand, is a QoS parameter that police/shape the bit rate of all non-GBR bearers of a user equipment regardless of the APN. It may be viewed as the user equipments maximum allowed transfer rate according to the subscription to an operator's services. The UE-AMBR is, just as the APN-AMBR, part of the users subscription data and is received by the MME/S4-SGSN from the HSS or HLR. The enforcement of UE-AMBR is done in the Radio Access Network (RAN), i.e. eNodeB for EUTRAN, both for UL and DL. The value that is used by the RAN is actually not the subscribed UE-AMBR. The MME/S4-SGSN uses an algorithm that calculates the sum of all authorized APN-AMBRs for all active PDN-connections going to different APNs up to the value of the subscribed UE-AMBR, i.e.:

$$\text{Used UE-AMBR}=\text{MIN}(\text{SUM}(\text{authorized APN-AMBR}),\text{subscribed UE-AMBR})$$

This is the value that is sent to the RAN for enforcement of UE-AMBR. In case the authorized APN-AMBR of one or several PDN-connections to different APNs changes or in case PDN-connections to new APNs are established or released, the used UE-AMBR is re-calculated by the MME/SGSN and an update is then sent to the RAN During the design of Evolved Packet System (EPS) it was decided that it should be possible to change the APN-AMBR by the use of PCC, i.e. it should be possible to upgrade/downgrade authorized APN-AMBR from the PCRF. It has been decided in the standard that all PDN-connections going to the same APN must end up in the same PGW and consequently at the same PCRF. Therefore it was possible to control the APN-AMBR through PCC.

However it was deemed impossible to control the UE-AMBR in the same way for the single reason that in case a user equipment establishes multiple PDN-connections to different APNs, e.g. one PDN-connection activated for regular Internet access and at the same has one PDN-connection established to a corporate APN, then those two PDN-connections may end up on different PGWs and on different PCRFs. If UE-AMBR was to be controlled by the use of PCC then different PCRFs may attempt to control the UE-AMBR at the same time and thus sending contradicting information back to the MME/SGSN. This may be illustrated with the example shown in FIG. 1. The MME/SGSN 101 receives the UE-AMBR. The enforcement of the UE-AMBR is done in the RAN 103. However, as there are two PDN connections 105a, 105b, they end up in different PGWs 109a, 109b and on different PCRFs, e.g. PCRF1 113a and PCRF2 113b. PCRF1 113a may have a UE-AMBR with the value e.g. X, and PCRF2 113b may have a UE-AMBR with a value e.g. Y. Thus, the MME/SGSN 101 will receive contradicting information from PCRF1 113a and PCRF2 113b. FIG. 1 is only an example using LTE access, but other access types such as e.g. 2G/3G is also applicable.

As a consequence the UE-AMBR can not be dynamically changed by PCC, but is always upper bounded to the subscribed value received from the HSS. An operator that wants to e.g. temporarily promote or upgrade a user equipment to a higher UE-AMBR would have to do so by changing subscription data in the HSS.

SUMMARY

The objective problem is therefore to obviate at least some of the above disadvantages and to provide improved optimization of bit rate in a communication network.

According to a first aspect of the invention, the objective problem is solved by a method in a first communication node for enabling authorization of the first communication node to determine a first bit rate. The first communication node receives, from a second communication node, a message comprising at least one trigger to determine a first bit rate. A first rank is obtained. The first bit rate associated with the first rank is determined.

Then, the first bit rate associated with the first rank is transmitted to the second communication node, enabling authorization of the first communication node to determine the first bit rate.

According to a second aspect of the invention, the objective problem is solved by a first communication node for enabling authorization of the first communication node to determine a first bit rate. The first communication node comprises a receiving unit configured to receive, from a second communication node, a message comprising at least one trigger to determine a first bit rate and an obtaining unit which is configured to obtain a first rank. The first communication node further comprises a determining unit configured to determine the first bit rate associated with the first rank. The first communication node comprises a transmitting unit configured to transmit the first bit rate associated with the first rank to the second communication node, enabling authorization of the first communication node to determine the first bit rate.

Since the first communication node obtains a first rank and determines the first bit rate associated with the first rank, the first communication is authorized to determine the first bit rate.

The present technology affords many advantages, for which a non-exhaustive list of examples follows:

With the present solution it is possible to dynamically control the maximum value of the UE-AMBR of a user equipment without doing modifications in the subscription data in the HSS/HLR. This is valuable e.g. in case an operator wants to temporarily upgrade the UE-AMBR of a user equipment as a bonus or promotion or in case an operator wants to temporarily downgrade the UE-AMBR e.g. when the user equipment is roaming abroad.

In addition the present signaling of the maximum allowed UE-AMBR of the serving network provides a mean for a visiting/serving operator to limit the home operator's capability to set a value of UE-AMBR that either may not be supported by the serving network or that the operator do not want to provide to the roaming user equipment.

The present solution is not limited to the features and advantages mentioned above. A person skilled in the art will recognize additional features and advantages upon reading the following detailed description.

BRIEF DESCRIPTION OF THE DRAWINGS

The present solution will now be further described in more detail in the following detailed description by reference to the appended drawings illustrating embodiments of the solution and in which.

The drawings are not necessarily to scale, emphasize is instead being placed upon illustrating the principle of the solution.

DETAILED DESCRIPTION

The present solution allows changing a maximum allowed UE-AMBR by the use of PCC through a mechanism that involves the PCRF providing a rank in addition to the authorized maximum UE-AMBR that resolves the potential conflict with multiple PCRFs attempting to change this value. In case of roaming it also comprises a function for the MME/SGSN in the serving/visitor network to restrict the home network from setting a too high UE-AMBR.

This disclosure relates to a mechanism for controlling UE-AMBR by the use of dynamic PCC, PCRF deployed, or through static PCC, i.e. statically configured policies in the PGW/GGSN, PCRF not deployed, that works also for the case when there are multiple simultaneous connections to different APNs that go to different PGW/GGSN and PCRFs. The solution is applicable both for non-roaming and for roaming scenarios. For the roaming case the solution is applicable both for home routed and visited access, so called local breakout.

Figure 1:
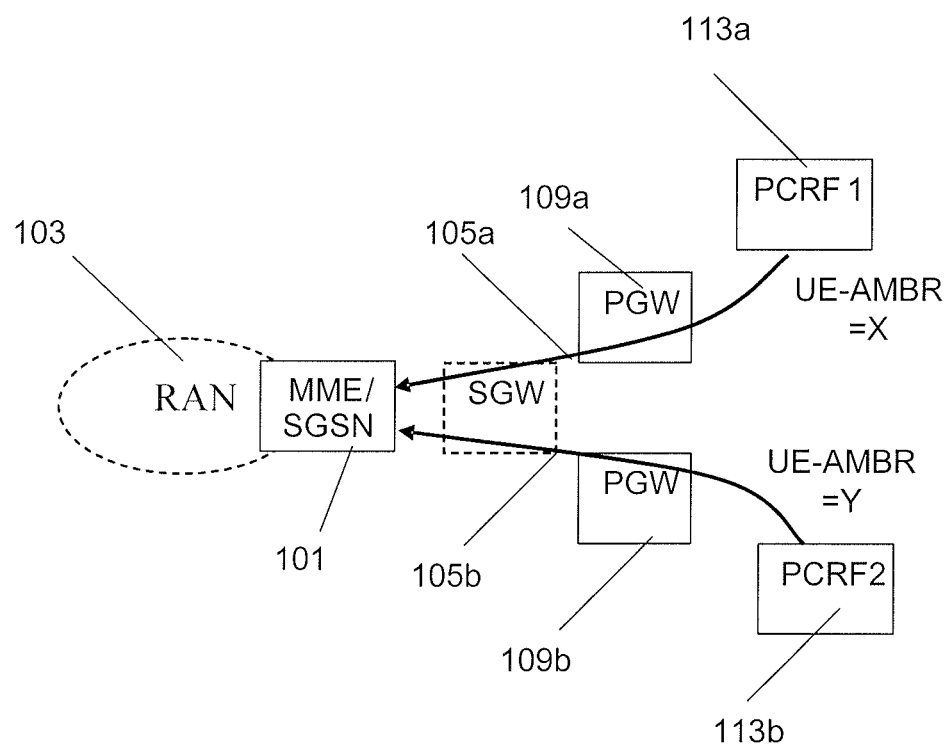
FIG. 1 is a block diagram illustrating multiple PDN-connections to different APNs.
Figure 2:
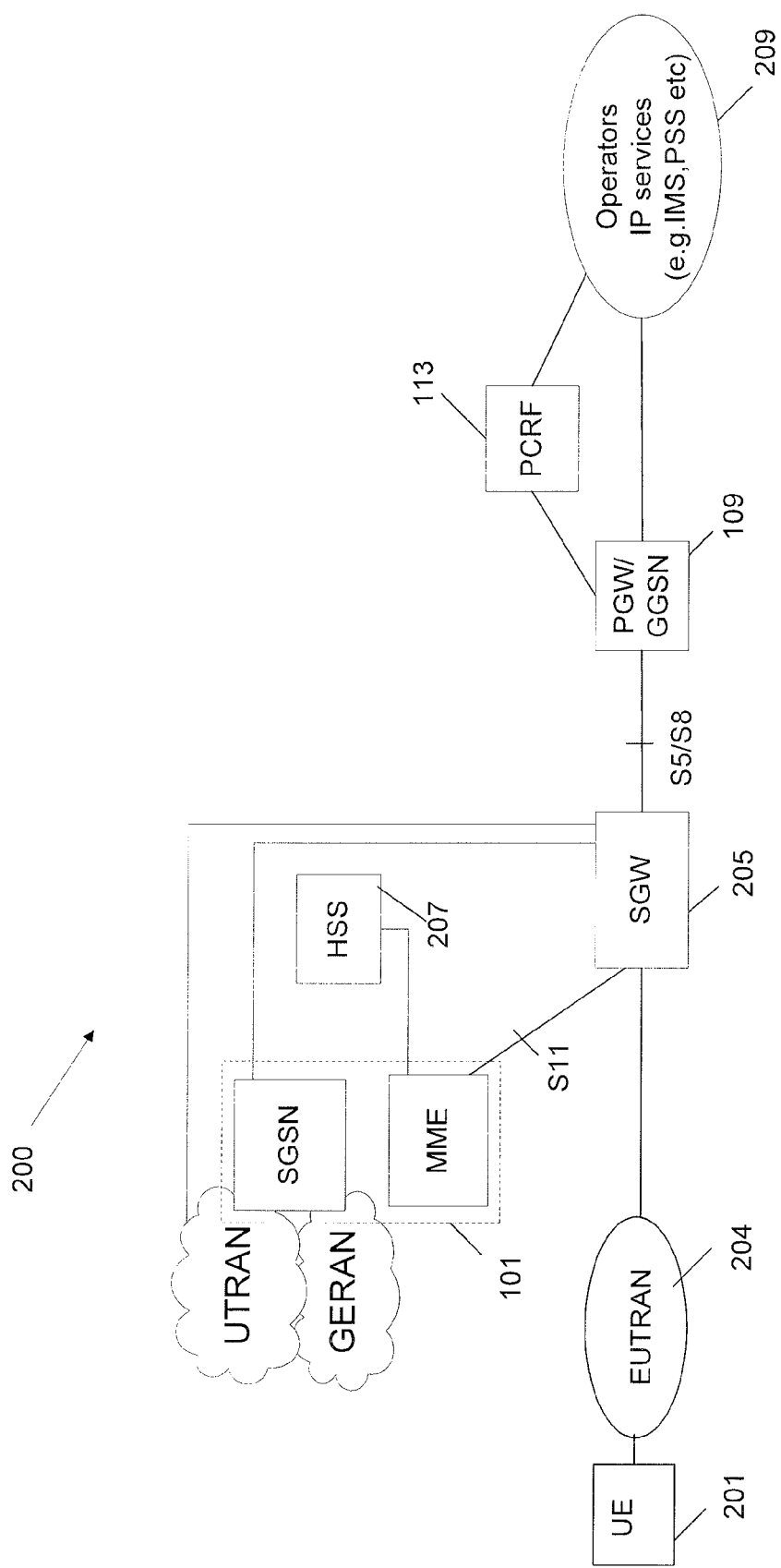
FIG. 2 is a signaling diagram illustrating embodiments of a communication system.

FIG. 2 is a simplified illustration of an embodiment of a communication network 200 in the case of non-roaming for 3GPP access for E-UTRAN access. As understood by a person skilled in the art, other types of access are also applicable. The communication network 200 is a telecommunication network using wireless and/or wired communication techniques. The communication network 200 may use technologies such as LTE, GPRS etc. It should be noted that the communication links in the communication network 200 may be of any suitable kind including either a wired or wireless radio link. The link may use any suitable protocol depending on type and level of layer, e.g. as indicated by the Open System Interconnection (OSI) model, as understood by the person skilled in the art. The present solution is applicable to both a non-roaming and a roaming scenario, with or without dynamic PCC and to different types of access technology.

In the communication network 200, a user equipment 201 is connected to a radio access network, such as an E-UTRAN 204, i.e. the air interface of LTE. The E-UTRAN 204 comprises base station(s) (not shown), such as e.g. a NodeB, eNodeB or any other network unit capable to communicate over a radio carrier with the user equipment 201.

The user equipment 201 may be any suitable communication device or computational device with communication capabilities capable to communicate with a base station over a radio channel, for instance but not limited to mobile phone, smart phone, Personal Digital Assistant (PDA), laptop, MP3 player or portable Digital Video Disc (DVD) player, or similar media content devices, digital camera, or even stationary devices such as a Personal Computer (PC). A PC may also be connected via a mobile station as the end station of the broadcasted/multicasted media. The user equipment 201 may be referred to as UE in some of the drawings.

The communication network 200 comprises a mobility management unit, e.g. mobility management entity and/or SGSN MME/SGSN 101. In FIG. 2, MME/SGSN 101 is shown as one unit. However they may also be separate units, i.e. one MME unit and one SGSN unit. The MME/SGSN 101 provides control-plane functionality for mobility between LTE and (2G/3G) access networks.

The MME/SGSN 101 is responsible for authenticating the user equipment 201 by interacting with a subscription unit, e.g. a HSS 207.

The MME/SGSN 101 is connected to a Serving Gateway (SGW) 205. S11 is the interface between the MME/SGSN 101 and the SGW 205. The SGW 205 acts as a mobility anchor and routes and forwards user plane data between a PGW/GGSN 109 and the base station (not shown). The SGW 205 gets orders from the MME/SGSN 101 to establish, modify and release Evolved Packet System (EPS) bearers.

The PGW/GGSN 109 is the interface between the internal Internet Protocol (IP) network of the operator and external networks 209, i.e. the PGW/GGSN 109 provides connectivity between the user equipment 201 and external PDN 209. A user equipment 201 may have simultaneous connectivity with more than one PGW/GGSN 109 for accessing multiple PDNs. In case of roaming, there are two PGW/GGSN 109 units. The interface between the PGW/GGSN 109 and the SGW 205 is called S5/S8.

The PCRF 113 is connected between the PGW/GGSN 109 and an operator's IP services 209, such as e.g. IP Multimedia Subsystem (IMS), packet switch streaming (PSS) etc. and takes care of policy and charging issues between the user equipment 201 and the operator. In case of roaming, there may be a visitor PCRF (V-PCRF) and a home PCRF (H-PCRF). The interface between the H-PCRF, and the V-PCRF is the S9 interface. The S9 interface is only used in the roaming scenarios.

The PCRF 113 is not mandatory in the network 200 and in some embodiments such logical PCRF functions could be existed partly in the PGW/GGSN 109. In other words, if a standalone PCRF 113 does not exist, then the PGW/GGSN 109 will have a part of the PCRF function.

It should be appreciated that the network 200 is configured with cabling, routers, switches, and other network building elements (not shown) as understood by the skilled person, for instance as used for building an Ethernet or WAN network.

In general, for a first PDN-connection of a user equipment 201 a subscribed UE-AMBR received from the HSS 207 is provided by the MME/SGSN 101 to the PGW/GGSN 109 and forwarded to the PCRF 113. In addition the MME/SGSN 101 may comprise a maximum allowed roaming UE-AMBR for the serving network. The point of the maximum allowed UE-AMBR for a network is to e.g. restrict the home network of a roaming user equipment 201 to set a too high UE-AMBR that the serving network either may not support or that the serving operator do not want to supply for roaming user equipments 201.

The authorized UE-AMBR together with a rank is provided in the response from the PCRF 113 to the PGW/GGSN 109 and forwarded to the MME/SGSN 101. In case the MME/SGSN 101 provided a maximum allowed roaming UE-AMBR for the network then the PCRF 113 should not attempt to assign an authorized UE-AMBR higher than this value, i.e. authorized UE-AMBR<maximum allowed roaming UE-AMBR. The MME/SGSN 101 uses the authorized UE-AMBR value instead of the subscribed value when it calculates the used UE-AMBR that is sent to the RAN, i.e. EUTRAN 204:

Used UE-AMBR=MIN(SUM(authorized APN-AMBR),authorized UE-AMBR)

For any additional PDN-connections the MME/SGSN 101 shall forward the latest authorized UE-AMBR, the rank associated with this parameter and optionally the maximum allowed UE-AMBR of the serving network to the PGW/GGSN 109.

A rank provided by a PCRF 113 in addition to an authorized UE-AMBR decision indicates the importance of the PCRF 113 decision, i.e. the decision of setting of authorized UE-AMBR:

A PCRF 113 with inferior rank should not attempt to change the UE-AMBR decision made by a PCRF 113 with superior rank A PCRF 113 with superior rank may attempt to change the UE-AMBR made by a PCRF 113 with inferior rank.

In case the authorized UE-AMBR is changed mid-session by a PGW/GGSN 109, decided by a PCRF 113 in case dynamic PCC is deployed, and there are additional PDN-connections that terminates at different PGW/GGSNs 109, then those PDN-connections may be updated with the latest available authorized UE-AMBR, the rank of that PCRF 113 decision and optionally the maximum authorized UE-AMBR of the serving network.

The present solution method for enabling authorization to determine a bit rate parameter according to some embodiments will now be described with reference to the signaling diagram depicted in FIG. 3 and with reference to FIG. 2 illustrating the communication network 200. In case of roaming, the home-PCRF is indicated as PCRF1 113*a* and the visited-PCRF is indicated as PCRF2 113*b* in FIG. 3, as an example. The same is valid for the home-PGW/GGSN which is indicated as PGW/GGSN1 119*a* and the visitor-PGW-GGSN indicated as PGW/GGSN2 119*b*, as an example. However, any of the PCRF 1 113*a* and PCRF2 113*b* may be home PCRF or visited PCRF.

The method comprises the following steps, which steps may as well be carried out in any suitable order as understood by a person skilled in the art. The steps 301-305 relates to a user equipment's 201 initial attach to a first PDN. The steps 306-312 relates to the user equipments 201 attach to a second, or higher, PDN using a different APN than in the first attach. A person skilled in the art will understand that the steps used for attach to a second PDN is also applicable for any PDN connection, except from the first initial connection. The method illustrated in FIG. 3 is exemplified for LTE access, however other access technologies may also be applicable, such as e.g. 2G/3G.

Step 301

At a user equipments 201 initial attach to a first PDN, a subscribed UE-AMBR is provided from the HSS 207 to the MME/SGSN 101. In this example the subscribed UE-AMBR is 20 Mbps. The subscribed UE-AMBR is a static value defined by the home operator and stored in e.g. a memory unit, in the HSS 207 in case of LTE, or in the HLR in the case of 2G/3G.

Step 302

The MME/SGSN 101 sends a Create Session Request, in case of LTE, via the S11 interface and the S5/S8 interface or a Create PDP Context Request message, in case of GPRS, via Gn/Gp to the PGW/GGSN 109. S11 is the interface between the MME/SGSN 101 and the SGW 205, S5/S8 is the interface between the SGW 205 and the PGW/GGSN 109, and Gn/Gp is the interface between the SGSN 101 and GGSN 109 in case of GPRS. Note that in case of LTE the signaling (not shown) goes via the SGW 205.

The subscribed UE-AMBR may be comprised in the Create Session Request or the Create PDP Context Request message. The MME/SGSN 101 may comprise the maximum allowed UE-AMBR for the serving network in case the user equipment 201 is roaming. In this example the maximum allowed UE-AMBR is set to 50 Mbps.

In case dynamic PCC is deployed, the PGW/GGSN 109 forwards the subscribed UE-AMBR and the maximum allowed UE-AMBR for the serving network over the Gx interface to the home-PCRF 113b. Note that in case of roaming with visited access the information is also forwarded from the visited-PCRF 113a to the home-PCRF 113b over the S9 interface.

Step 303

The visited-PCRF 113₁ obtains a rank for the decision to change the UE-AMBR. The rank may be obtained from a computer readable memory, i.e. a memory unit, in the PCRF 1131. The rank may be preconfigured and stored in the memory unit. In some embodiments, the rank may be calculated or determined in the PCRF 113a.

Step 304

The PCRF 113a determines an authorized UE-AMBR associated with the obtained rank. As mentioned earlier, the authorized UE-AMBR may be different from the subscribed UE-AMBR but should not be higher than the maximum allowed UE-AMBR for the serving network, if received. In this example the rank is set to X and the authorized UE-AMBR is set to 40 Mbps.

In case dynamic PCC is not deployed the PGW/GGSN 109 determines an authorized UE-AMBR based on local policies, and takes the maximum allowed UE-AMBR for the serving network into account. The rank may also be determined based on local policies which may be configured in the PGW or GGSN 109.

Step 305

In case dynamic PCC is deployed the (home-)PCRF 113a provides the authorized UE-AMBR in the response over Gx, and S9 in case of a roaming scenario with visited access.

In detail, the PGW/GGSN 109 provides the authorized UE-AMBR and the rank to the MME/SGSN 101 in the Create Session Response, in case of EPC or via Request PDP-Context Accept message, in case of GPRS.

Step 306

The MME/SGSN 101 use the authorized UE-AMBR when calculating the used UE-AMBR. The MME/SGSN 101 transmits the used UE-AMBR to the RAN, i.e. the EUTRAN 204.

Step 307

Later on, the user equipment 201 requests connectivity to a different, e.g. second, APN. The MME/SGSN 101 sends a Create Session Request, in case of EPC, via S11 and S5/S8 or a Create PDP Context Request message, in case of GPRS, via Gn/Gp to the PGW/GGSN2 109b and comprises the latest authorized UE-AMBR, e.g. 40 Mbps, the rank of the decision, e.g. X, and the maximum allowed UE-AMBR for the serving network, e.g. 50 Mbps.

In case dynamic PCC is deployed the PGW/GGSN2 109₂ forwards this information over Gx, and S9 in case of roaming with visited access to the (home-)PCRF2 113b.

Step 308

The PCRF2 113b obtains a rank for the decision, e.g. Y. The rank may be preconfigured in the PCRF2 113b and e.g. stored in a memory unit in the PCRF2 113b. In some embodiments, the rank may be calculated or determined in the PCRF2 113b.

Step 309

The PCRF2 113b compares the received latest rank, e.g. X, with its own rank Y. The new PCRF 113a, or PGW/GGSN 109a in case dynamic PCC is not deployed, has a rank of X+Y, where X+Y>X, which is associated with the current UE-AMBR.

Step 310

The PCRF2 113b updates or changes the authorized UE-AMBR, e.g. 30 Mbps. A prerequisite for the updated authorized UE-AMBR is that the updated authorized UE-AMBR is should not be higher than the max allowed roaming UE-AMB for the serving network, if received.

Step 311

The PCRF2 113b transmits the authorized UE-AMBR, via the PGW/GGSN2 109b, back to the MME/SGSN 101 of e.g. 30 Mbps together with the updated rank (X+Y). The rank reflects the PCRF who authorized the latest UE-AMBR.

The MME/SGSN 101 uses the updated authorized UE-AMBR when re-calculating the used UE-AMBR that is sent to the RAN 204.

Step 312

Since the authorized UE-AMBR has changed, i.e. been updated, and there is at least one active PDN-connection to another APN that is associated with another PGW/GGSN 109, the MME/SGSN 101 sends an update to the first/home PGW1 109a and comprises the updated authorized UE-AMBR, e.g. 30 Mbps, and the maximum allowed UE-AMBR, e.g. 50 Mbps. In case dynamic PCC is deployed the information is forwarded to the (home-) PCRF2 113b. Since the rank of the first/visitor PCRF1 113a, in case dynamic PCC is deployed, or first PGW/GGSN1 109a, in case dynamic PCC is not deployed, is lower than the rank of the second/home PCRF2 113b or PGW/PCRF1 109a, the first/visitor PCRF1 113a or PGW/GGSN2 109b may not change the latest authorized UE-AMBR again.

Step 313

If needed other QoS related parameters e.g. APN-AMBR is modified and transmitted in the response to the MME/SGSN 101.

Step 314

The MME/SGSN 101 uses the updated authorized UE-ABR, max allowed roaming UE-ABR and the modified QoS parameters to calculate the used UE-AMBR.

The rank parameter may be accomplished in a number of different ways. For example the rank may be a numeric value and the algorithm for deciding which PCRF 113 that has the highest rank may be a simple MIN or MAX operation. It may also be a more advanced decision taking multiple parameters into account e.g. if the PCRF 113 and the user equipment 201 is located in the home or visited network, special roaming agreements, the APN and even time.

In short the rules that decide the rank of the PCRF 113, i.e. which PCRF 113 that has the right to set authorized UE-AMBR, may be arbitrary and dependent on the operators needs. The notification of the rank may be a numeric value, but it may also be any other notification that is unambiguously understood by all PCRFs 113.

As described above, the PCRF 113 is not mandatory in the network 200 and in some embodiments the logical functions of the PCRF 113 may be existed partly in PGW/GGSN 109.

In an embodiment where the PCRF exists, the RANK may be configured in the PCRF 113. In another embodiment, if a standalone PCRF 113 does not exist, then PGW/GGSN 109 will have part of PCRF 109 function, therefore rank may be configured in GGSN/PGW 109. Thus, the present solution is applicable for both 2G/3G and 4G radio access.

Figure 4:
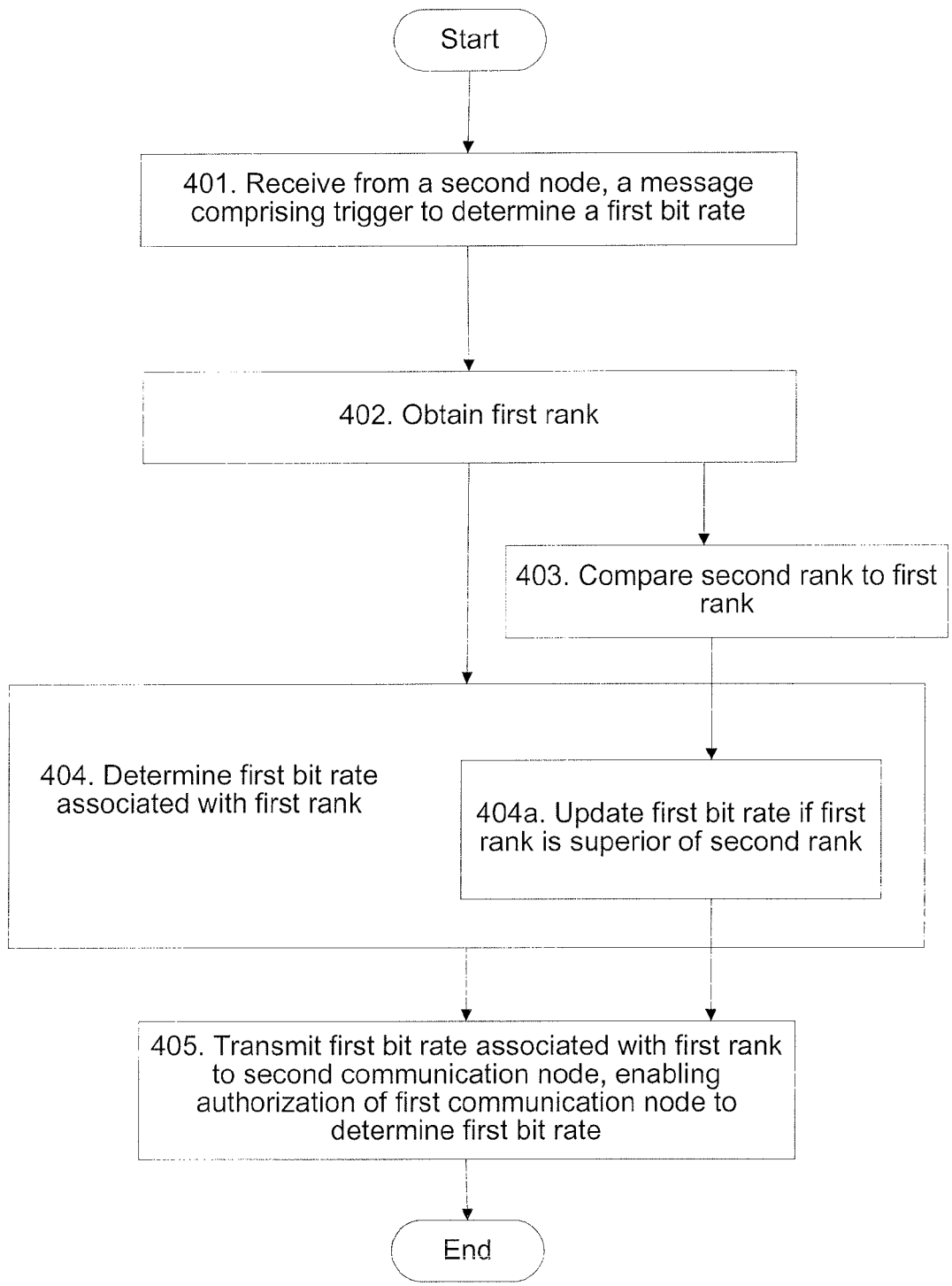
FIG. 4 is a schematic block diagram illustrating embodiments of a first communication node.

The method described above will now be described seen from the perspective of the first communication node 109, 113. FIG. 4 is a flowchart describing the present method in the first communication node 109,113, for enabling authorization of the first communication node 109,113 to determine a bit rate. The first communication node 109,113 may be one of a policy and charging rules function node, referred to as PCRF, and a packet data network gateway/gateway general packet radio service support node, referred to as PGW/GGSN. The method comprises the further steps to be performed by the application in the first communication node 109,113, which steps may be performed in any suitable order:

Step 401

Figure 3:
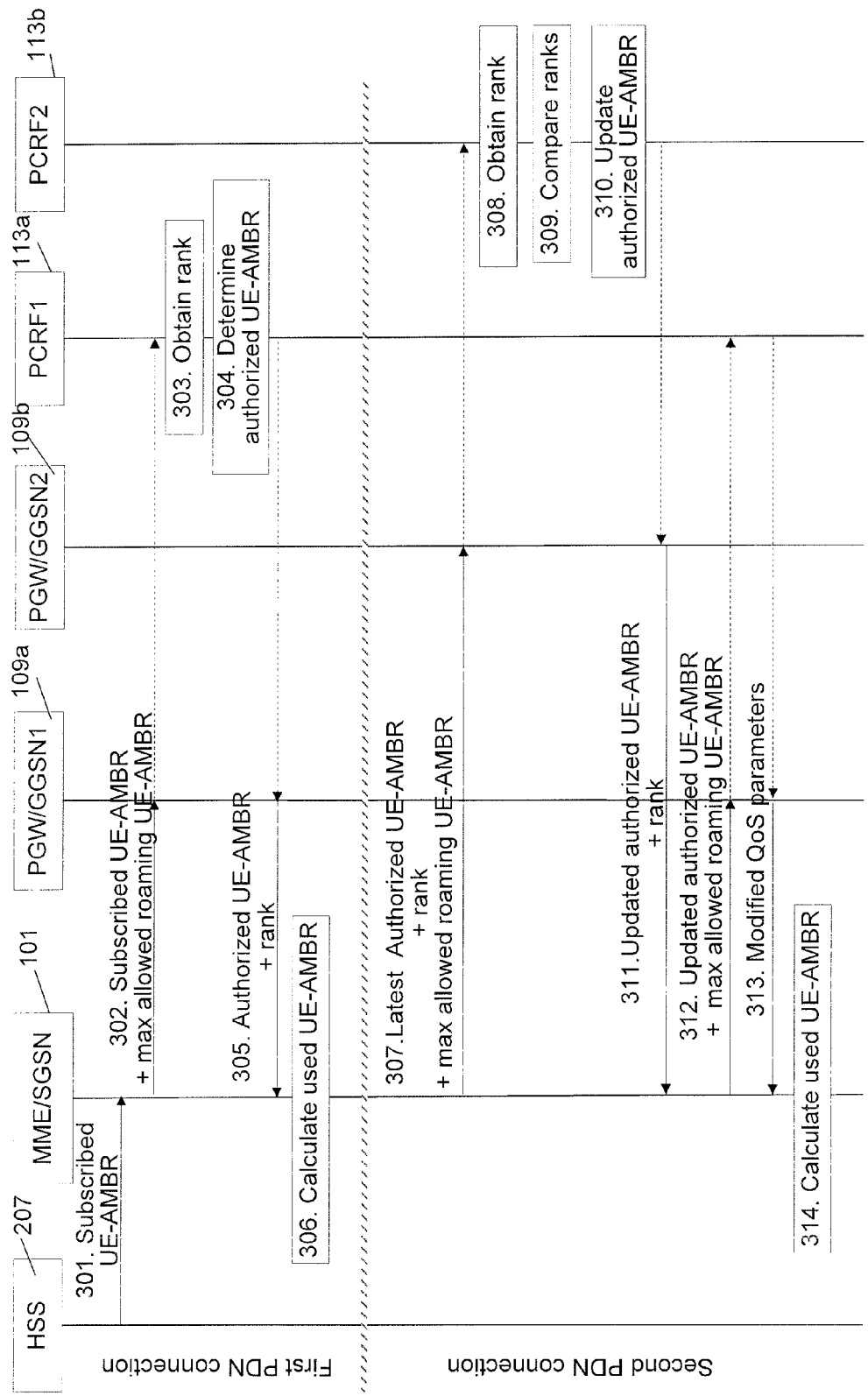
FIG. 3 is a combined schematic block diagram and flowchart depicting embodiments of a method.

This step corresponds to steps 302 and 306 in FIG. 3.

The first communication node 109,113 receives, from a second communication node 101, a message comprising at least one trigger to determine a first bit rate. The trigger may be when the user equipment requests PDN connectivity.

In some embodiments, the message further comprises a second bit rate associated with a second rank.

In some embodiments, the message further comprises a maximum bit rate. The maximum bit rate may be larger than the first bit rate, and the first bit rate may be different from the second bit rate. This is the case when the user equipment 201 is roaming.

In some embodiments, the message further comprises a subscribed user equipment-aggregated maximum bit rate, referred to as subscribed UE-AMBR.

In some embodiments, the message further comprises a latest authorized user equipment-aggregated maximum bit rate, referred to as latest authorized UE-AMBR, and a rank associated with the latest authorized UE-AMBR.

The second communication node 101 may be a mobility management entity/serving general packet radio service support node, referred to as MME/SGSN.

Step 402

This step corresponds to steps 303 and 308 in FIG. 3.

The first communication node 109,113 obtains a first rank.

The first rank may be obtained from a computer readable medium in the first communication node 109,113. The first rank may be preconfigured and stored in the computer readable medium.

Step 403

This step corresponds to step 309 in FIG. 3.

In some embodiments, the first communication node 109, 113 compares the second rank to the first rank.

Step 404

This step corresponds to step 304 in FIG. 3.

The first communication node 109,113 determines the first bit rate associated with the first rank.

In some embodiments, the first bit rate is one of an authorized user equipment-aggregated maximum bit rate, referred to as UE-AMBR, and an updated authorized UE-AMBR Step 404*a*

This corresponds to step 310 in FIG. 3.

In some embodiments, as a sub step of step 404, the first communication node 109,113 may update the first bit rate if the first rank is superior of the second rank.

Step 405

This corresponds to steps 305 and 312 in FIG. 3.

The first communication node 109, 113 transmits the first bit rate associated with the first rank to the second communication node 101, enabling authorization of the first communication node 109,113 to determine the first bit rate.

Figure 5:
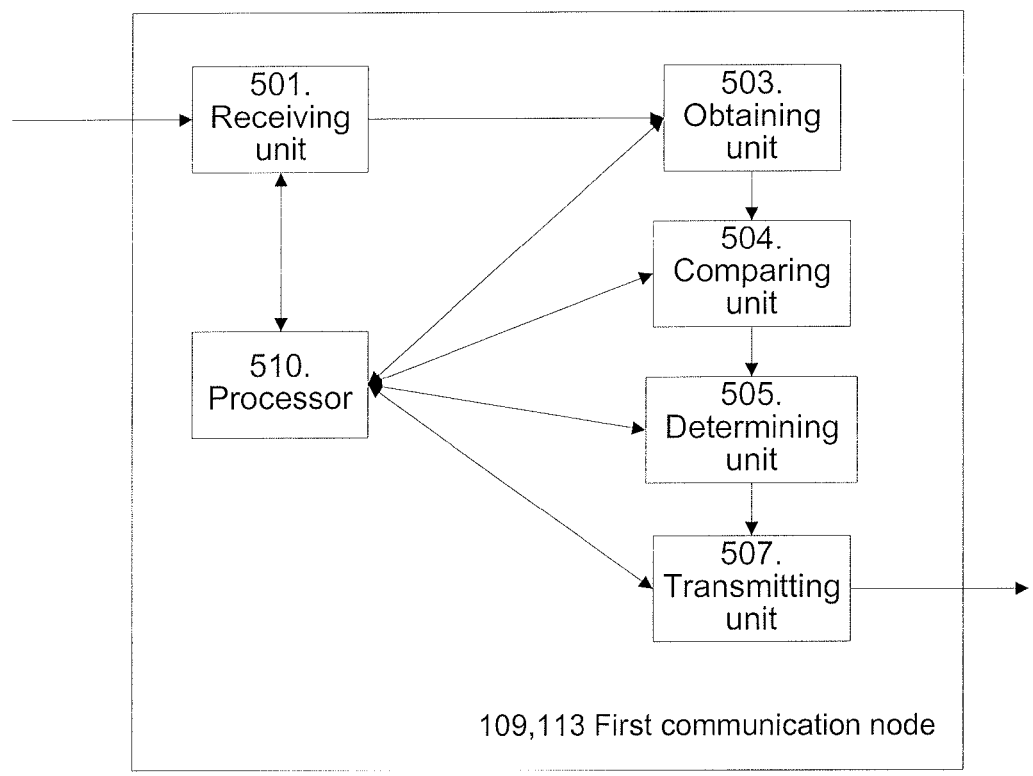
FIG. 5 is a flowchart depicting embodiments of a method in a first communication node.

To perform the method steps shown in FIG. 4 for enabling authorization of the first communication node 109,113 to determine a bit rate, the first communication node 109,113 comprises a first communication node arrangement as shown in FIG. 5. The first communication node 109,113 comprises a receiving unit 501 configured to receive, from a second communication node 101, a message comprising at least one trigger to determine a first bit rate. The message may further comprise a second bit rate associated with a second rank. In some embodiments, the message further comprises a maximum bit rate. The maximum bit rate may be larger than the first bit rate, and the first bit rate may be different from the second bit rate. In some embodiments, the message further comprises a subscribed user equipment-aggregated maximum bit rate, referred to as subscribed UE-AMBR. Further, in some embodiments the message further comprises a latest authorized user equipment-aggregated maximum bit rate, referred to as latest authorized UE-AMBR, and a rank associated with the latest authorized UE-AMBR. The first bit rate may be one of an authorized user equipment-aggregated maximum bit rate, referred to as UE-AMBR and an updated authorized UE-AMBR. The first communication node 109, 113 may be one of a policy and charging rules function node, referred to as PCRF, and a packet data network gateway/gateway general packet radio service support node, referred to as PGW/GGSN, and the second communication node 101 may be a mobility management entity/serving general packet radio service support node, referred to as MME/SGSN.

The first communication node 109, 113 further comprises an obtaining unit 503 which is configured to obtain a first rank. In some embodiments, the first rank is obtained from a computer readable medium in the first communication node 109,113, and the first rank is preconfigured and stored in the computer readable medium. The first communication node 109, 113 may comprise a comparing unit 504 configured to compare the second rank to the first rank. Further, the first communication node 109, 113 comprises a determining unit 505 which is configured to determine the first bit rate associated with the first rank. In some embodiments, the determining unit 505 is further configured to update the first bit rate if the first rank is superior of the second rank. The first communication node 109,113 also comprises a transmitting unit 507 configured to transmit first bit rate associated with the first rank to the second communication node 101, enabling authorization of the first communication node 109,113 to determine the first bit rate.

The present mechanism for enabling authorization of the first communication node 109,113 to determine a bit rate may be implemented through one or more processors, such as a processor 510 in the first communication node arrangement depicted in FIG. 5, together with computer program code for performing the functions of the present solution. The processor 510 may be for example a Digital Signal Processor (DSP), Application Specific Integrated Circuit (ASIC) processor, Field-programmable gate array (FPGA) processor or micro processor. The program code mentioned above may also be provided as a computer program product, for instance in the form of a data carrier carrying computer program code for performing the present solution when being loaded into the first communication node 109, 113. One such carrier may be in the form of a CD ROM disc. It is however feasible with other data carriers such as a memory stick. The computer program code may furthermore be provided as pure program code on a server and downloaded to the first communication node 109, 113 remotely.

The present solution is not limited to the above described preferred embodiments. Various alternatives, modifications and equivalents may be used. Therefore, the above embodiments should not be taken as limiting the scope of the solution, which is defined by the appending claims.

It should be emphasized that the term "comprises/comprising" when used in this specification is taken to specify the presence of stated features, integers, steps or components, but does not preclude the presence or addition of one or more other features, integers, steps, components or groups thereof.

It should also be emphasized that the steps of the methods defined in the appended claims may, without departing from the present solution, be performed in another order than the order in which they appear in the claims.

The invention claimed is:

1. A method in a first network node, the first network node being one of: i) a policy and charging rules function (PCRF)

node, ii) a packet data network gateway (PGW), and iii) a gateway general packet radio service support node (GGSN), the method comprising:

receiving, at the first network node, a trigger message transmitted by a second network node, the trigger message comprising a first user equipment aggregated maximum bit rate (UE-AMBR) and a first rank value (r1) indicating a rank of a second network node;

in response to the trigger message, the first network node: i) obtaining a second rank value (r2) indicating a rank of the first network node, ii) comparing r2 against r1, iii) determining that r2 is greater than r1; and iv) in response to determining that r2 is greater than r1, selecting an authorized UE-AMBR that is different than said first UE-AMBR; and transmitting, from the first network node to the second network node, a response message comprising the selected authorized UE-AMBR and r2.

2. The method according to claim 1, wherein the trigger message further comprises a maximum allowed UE-AMBR, and the step of selecting the authorized UE-AMBR comprises selecting the authorized UE-AMBR such that the selected authorized UE-AMBR is less than or equal to the maximum allowed UE-AMBR.

3. The method according to claim 1, wherein the first UE-AMBR is a latest authorized UE-AMBR.

4. The method according to claim 1, wherein the authorized UE-AMBR is an updated authorized UE-AMBR.

5. A first network device, comprising:

a communication interface for receiving a trigger message transmitted by a second network device; and a processor configured to:

in response to the trigger message, i) obtain a first rank value identifying a rank of the first network device, ii) select an authorized user equipment aggregated maximum bit rate (UE-AMBR) using the first rank value and iii) transmit the authorized UE-AMBR and the first rank to the second network node, wherein the trigger message comprises a first UE-AMBR and a second rank value (r2), and using the first rank value (r1) to select the authorized UE-AMBR comprises:

i) comparing r1 against r2, ii) determining that r1 is greater than r2; and iii) in response to determining that r2 is greater than r1, selecting an authorized UE-AMBR that is different than said first UE-AMBR.

6. The first network device according to claim 5, wherein the trigger message further comprises a maximum allowed UE-AMBR; and wherein the maximum allowed UE-AMBR is larger than the selected authorized UE-AMBR.

7. The first network device according to claim 6, wherein the first UE-AMBR is a latest authorized UE-AMBR.

8. The first network device according to claim 5, wherein the authorized UE-AMBR is an updated authorized UE-AMBR.

9. A method performed by a mobility management node (MMN), wherein the MMN is one of: a Mobility Management Entity (MME) and a serving general packet radio service support node (SGSN), the method comprising:

the MMN transmitting a first trigger message;

the MMN receiving, in response to the first trigger message, a first response message transmitted by a first network node, the first response message comprising a first authorized user equipment-aggregated maximum bit rate (UE-AMBR) and a first rank value identifying a rank of the first network node;

the MMN transmitting a second trigger message, the second trigger message comprising the first UE-AMBR and the first rank value identifying the rank of the first network node; and the MMN receiving, in response to the second trigger message, a second response message transmitted by a second network node, the second response message comprising a second UE-AMBR and a second rank identifying the rank of the second network node, wherein the second UE-AMBR is greater than the first UE-AMBR and the second rank is greater than the first rank.

10. The method of claim 9, wherein the first network node is one of: i) a policy and charging rules function (PCRF) node, ii) a packet data network gateway (PGW), and iii) a gateway general packet radio service support node (GGSN).

11. The method according to claim 1, wherein the trigger message is one of: i) a Create Session Request and ii) a Create PDP Context Request.

12. The first network device according to claim 5, wherein the trigger message is one of: i) a Create Session Request and ii) a Create PDP Context Request.

13. The method of claim 9, wherein the trigger message is one of: i) a Create Session Request and ii) a Create PDP Context Request.

14. The method according to claim 1, wherein the first UE-AMBR is a static value defined by an operator.

15. The first network device according to claim 5, wherein the first UE-AMBR is a static value defined by an operator.

16. The method of claim 1, wherein monitoring the second UE-AMBR is a static value defined by an operator.

\* \* \* \* \*